Figure 1:
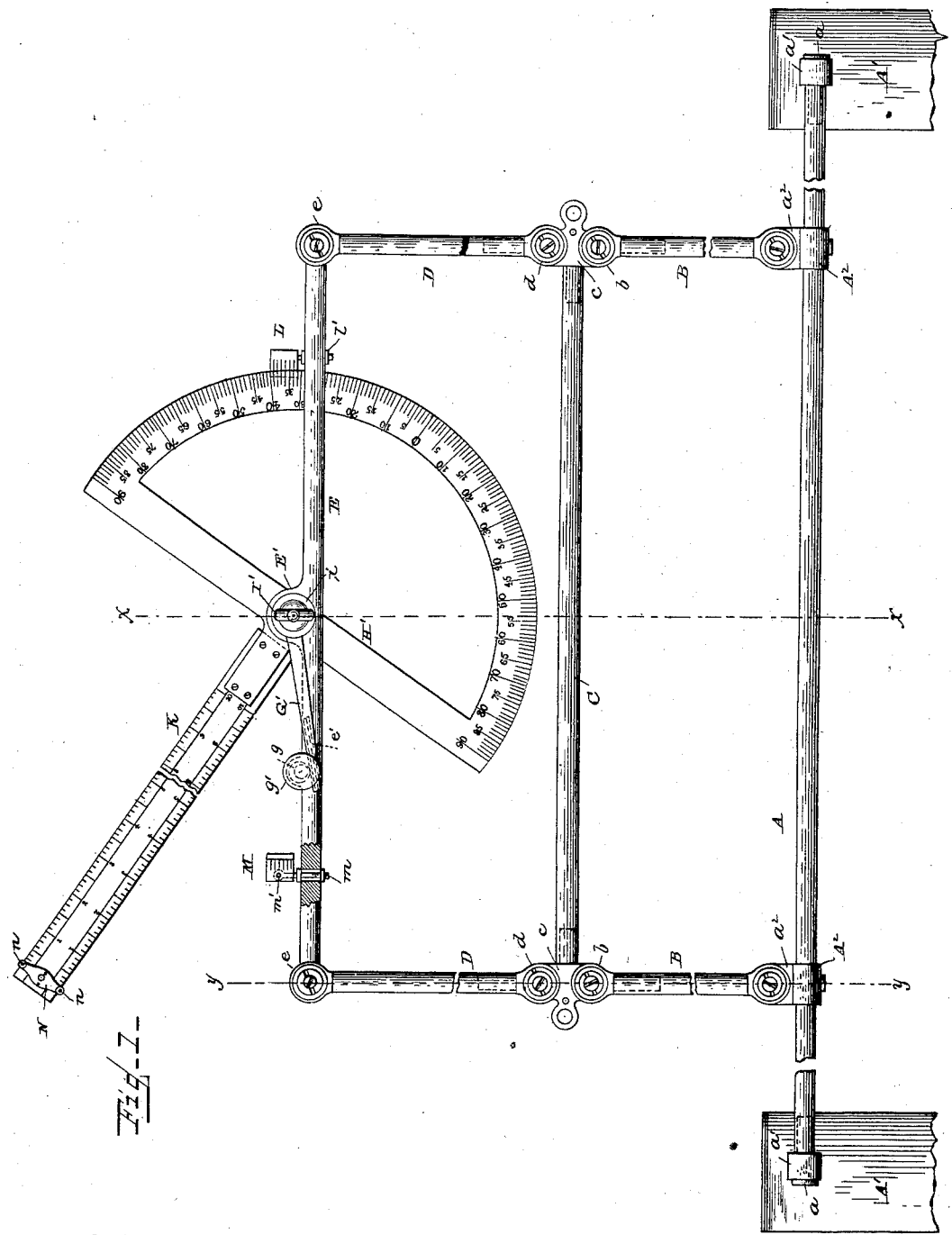

(No Model.)  2 Sheets—Sheet 1.
H. S. GAY.
COMBINED PARALLEL RULER AND PROTRACTOR.
No. 374,955.  Patented Dec. 20, 1887.

WITNESSES
Edwin I. Yewell.
Wm. J. Littell.

INVENTOR
Harry S. Gay,
by J. R. Littell,
Attorney

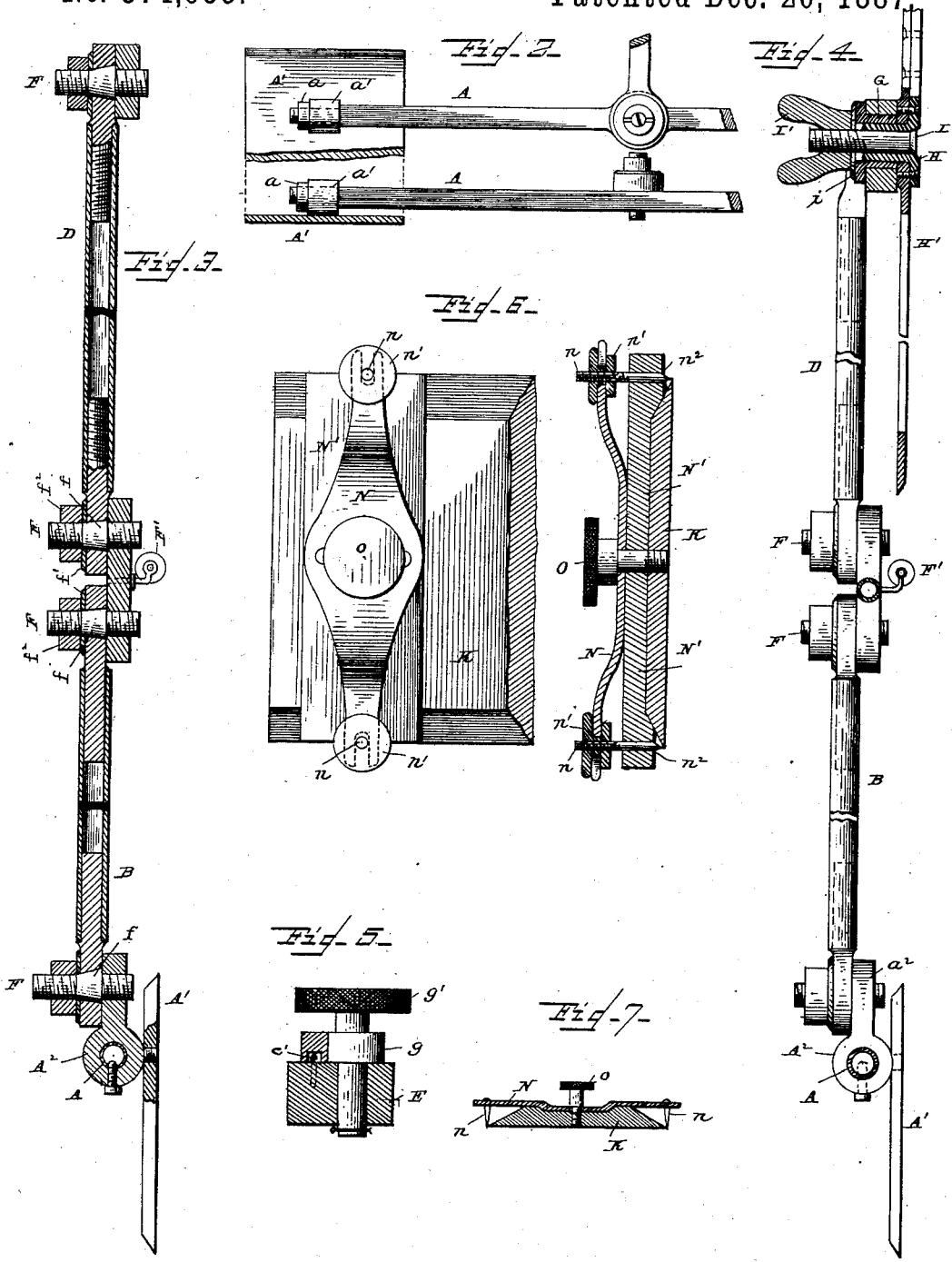

UNITED STATES PATENT OFFICE.

HARRY S. GAY, OF LYKENS, PENNSYLVANIA.

COMBINED PARALLEL-RULER AND PROTRACTOR.

SPECIFICATION forming part of Letters Patent No. 374,955, dated December 20, 1887.

Application filed August 5, 1887. Serial No. 246,212. (No model.)

*To all whom it may concern:*

Be it known that I, HARRY S. GAY, a citizen of the United States, residing at Lykens, in the county of Dauphin and State of Pennsylvania, have invented certain new and useful Improvements in Draftsmen's Instruments, of which the following is so full, clear, and exact a description as to enable those skill in the art to make and use the same.

This invention relates to that class of draftsmen's implements in which are combined straight-edge parallel-rulers and a protractor comprising a straight-edge and an arced scale to determine the relation of the straight-edge of the protractor with a determined right line.

The object of my invention is to provide an implement for the use of draftsmen, architects, engineers, and others, embodying the functions of a number of ordinary draftsmen's implements—such as heretofore named—in order to effect a saving of time and labor.

The invention consists, primarily, in a compound parallel-ruler—that is to say, a ruler jointed to move parallel with a fixed line and one or more supplementary rulers jointed to that first named to move parallel both with the first ruler and fixed line.

The invention consists, further, in the combination, with a parallel-ruler, of one or more fixed scales or verniers and a pivoted arc or protractor scaled to register therewith.

The invention consists further in the combination, with a parallel ruler having a fixed scale and a pivoted scaled arc, of a pointer or straight-edge rigidly secured to and moving with said scaled arc.

The invention consists, further, in minor novel features, details of construction, and combinations, which will be hereinafter fully described, and claimed in the clauses at the close of this specification.

In the accompanying drawings, Figure 1 illustrates my improved implement in plan view. Fig. 2 represents in plan and elevation a detail of one end of the anchor-bar and link. Fig. 3 is a vertical section on the line $y\,y$ of Fig. 1. Fig. 4 is a similar section on the line $x\,x$ of Fig. 1. Fig. 5 represents by sectional view a detail of one of the verniers. Fig. 6 represents in plan and section one form of the point-markers. Fig. 7 is a sectional view illustrating a modification.

Corresponding reference-letters are used in all the figures to designate identical parts.

In the ensuing description I shall term the parts of the parallel-ruler proper "rods," as I prefer to construct these parts of either solid or tubular rods. It will be understood, however, that the parts of the ruler proper may be made, if preferred, of flat bars, and of any suitable material ordinarily used in the manufacture of such instruments. For the sake of lightness, I prefer the tubular form of bar, and will proceed to describe an instrument having bars of that description. The ends of the base-bar A are seated in sleeves $a'$, secured to anchor-plates $A'$ of sufficient size and weight to hold the base-rod firmly during the manipulations of the movable parts of the ruler, some device—such as the cup-screws $a$—being used to prevent the accidental disengagement of the ends of the base-bar.

Mounted adjustably upon the base-bar A are sleeves $A^2$, provided with lugs $a^2$, perforated to receive a pivot-bolt. Each of the other bars, B, C, D, and E, of the ruler are provided at the ends with solid stubs, (lettered $b$, $c$, $d$, and $e$,) those lettered $b$, $d$, and $e$ having lugs perforated similarly to the lugs $a^2$, and those lettered $c$ each having two perforated lugs—one on either side of the center—as shown. These stubs are by preference threaded into the ends of the bars, the bars for this purpose being provided at their ends with right and left hand threads, in order that when coupled together the respective bars may be nicely adjusted with relation to each other. Thus fitted, the lower ends of the link-bars B are coupled to the lugs $a^2$ of sleeves $A^2$, their upper ends being similarly coupled to lugs projecting from stubs $c$ of bar C, or, as I shall hereinafter term it, the "primary ruler." The lugs at the ends of link-bars D are in the same manner coupled to lugs of the stubs $c$ and $e$.

The parts so far described constitute a double parallel-ruler, the primary ruler C being adapted to be adjusted nearer to or farther from the base-rod A, and in a plane parallel therewith, by a sidewise or lateral movement of the upper ends of the links B, and the secondary ruler E being capable of similar adjustment, both with relation to the base-rod and the primary ruler.

The lugs of the different stubs may be connected by ordinary rivets; but in order to compensate for wear I prefer that such joints be made in the form shown in Fig. 3—that is, the pivot-bolt F being threaded at each end and provided centrally with a cone, $f$, upon which the moving member of the joint is journaled. As shown, the lower end of a pivot-bolt, F, engages a tapped hole in a lug, the overlying lug being provided with a cone-shaped perforation fitting the coned part $f$ of the stub, and a washer, $f'$, being interposed between the upper face of the upper lug and the locking-nut $f^2$.

The stubs $c$ and $e$ may be provided on their under sides with small anti-friction bearing-points of any approved pattern—as, for instance, that shown at F', Figs. 3 and 4.

The secondary ruler E is provided centrally with a perforated lug, E', within which is journaled a flanged sleeve, G, Fig. 4, the arm G' being secured to or forming part of the flange of said sleeve. Within this sleeve G is journaled another flanged-sleeve, H, to the flange of which is rigidly secured the protractor or scaled arc H', hereinbefore referred to. The two sleeves are secured together and to the secondary ruler by means of the cone-headed screw I and thumb-nut I', as shown, a washer, $i$, being interposed between the thumb-nut and flange of sleeve G, for a purpose well known.

At a distance from the center of the arc H' equal to its radius two vernier-scales, L and M, are secured to the secondary ruler E, the post of vernier L being capable of a pivotal movement upon loosening the clamping-nut $l'$, which clamps said post to the ruler E, and the vernier M is, owing to the elongation of the slot in ruler E, through which its post $m$ passes, capable of adjustment nearer to or farther from the center of the arc H', and is also adjustable upon a transverse pivot-pin, $m'$, connecting the scale proper to the post $m$.

The outer end of the arm G' is held in contact by a spring, $e'$, with a cam-disk, $g$, journaled in ruler E, the purpose of this arrangement being to effect nice adjustments of the arc H' with relation to the verniers that could not be made by moving the arc with the hand. The arm G' being secured to the flange of sleeve G, and the arc H' being secured to the flange of sleeve H, which is seated within sleeve G, it follows that upon rotating the milled head $g'$ of cam-disk $g$ the cam-face of the latter will either move the outer end of arm G' in opposition to the pressure of the spring $e'$, or permit of its movement by said spring, moving the arc H' a corresponding distance in one direction or the other.

Projecting radially from the center of the arc is a parallel-edged scaled rule, K, provided at its outer end with a plate-spring, N, carrying at each end a needle-point, $n$, held normally free from contact with the surface upon which the instrument may rest.

It will be noted that the needle-points are located one on each side of the scaled rule K, and are in line with the respective edges of the rule at the first graduation or zero-mark. The object of these needle-points is to mark the end of a measured distance from any point, and this is effected by simply pressing the spring N.

In order that the needles may be adjusted to strike a greater or less distance into the paper to be marked, or to provide for repointing the needles if broken, I form a thread on the needle to engage a tapped hole in the holder $n'$. This holder $n'$ is provided centrally with a groove to fit within the forked end of spring N. In arranging the needles as last stated, it is expedient to provide a guide for the needles to insure their puncturing the paper in line with the edges of the ruler K. This guide may consist of a plate, N', provided with apertures $n^2$, within which the needles work, the plate being secured to the rule by a thumb-screw, O, or in any other convenient way. The needles are designed to be so positioned as to puncture the paper at the junction of the edge of the rule and the zero-mark thereon upon a downward pressure of the spring N.

The outer edge of the arc H' and the inner edges of the verniers L and M are reversely beveled, in order that said verniers may support the arc against sagging. This arrangement also serves to bring the scale-marks on the arc and the verniers more nearly on a horizontal plane with each other, so that adjustments can more easily and accurately be made. When it is desired for any purpose to remove the arc and its rule, the vernier L is turned with its post to free the lapping edges of the arc and vernier from each other, and the vernier M is either moved away from the arc or turned back on its transverse pivot. The edges of the arc then being free, the thumb-nut I' may be removed, thus permitting sleeve H, carrying the arc, to be withdrawn from sleeve G.

It will be understood that while I have herein described this implement as a whole, some of the parts may be used disconnected from the others, and other modifications made without departing from the invention. For instance, the double parallel-ruler can be used as such when the parts forming the protractor are removed, or the protractor, with its adjuncts, may be used when coupled to other than the secondary ruler of my improved double parallel-ruler; and the double parallel-ruler would be the same to all intents and purposes if made of solid or non-adjustable bars or without the coned bearing-surfaces described, and, if desired, other secondary rulers may be added to the construction herein described.

Having thus described my invention, what I claim, and desire to secure by Letters Patent, is—

1. A compound ruler comprising an anchored base-bar having pivotal end bearings, a primary-ruler, corresponding connecting-links pivoted to the base-bar near its anchored and pivoted ends, and having their other ends pivoted to the primary ruler, a secondary ruler corresponding to the primary ruler, and corresponding pivoted links connecting the secondary and primary rulers, substantially as set forth.

2. A compound parallel-ruler consisting of anchor-plates, a base-bar journaled at its ends in bearings carried thereby, and carrying adjustable sleeves provided with perforated lugs, the bars of the double parallel-ruler provided at each end with perforated lugs, and journal-pins connecting the lugs of the bars to each other and to said sleeves, substantially as described.

3. A compound parallel-ruler consisting, substantially as before set forth, of an anchored base-bar carrying adjustable sleeves, the tubular bars provided at each end with adjustable stubs having perforated lugs, and the pivot-pins.

4. A compound parallel-ruler comprising a base-bar having lugged sleeves mounted adjustably thereon, tubular bars provided at their ends with oppositely-cut internal threads, stubs provided with perforated lugs and with threads to engage the threads of the bars, and pivot-pins, substantially as described.

5. A pivot-joint for parallel-rulers, comprising a lug, as $a^2$, having a tapped hole, another lug having a cone-shaped perforation, a pivot bolt or pin threaded at each end and provided centrally with a cone, a washer, and a locking-nut, substantially as described.

6. In a parallel-ruler or the like, a rule-bar provided with and carrying the two verniers, in combination with the scaled arc pivoted upon the same bar between the verniers, its pivot being located at a central point between the latter, substantially as and for the purpose set forth.

7. The combination, substantially as described, of a parallel-ruler, one of the bars of which is provided with a circular opening and with verniers at a distance from said opening, an arc provided centrally with a sleeve fitting said opening, and at its edge with a scale registering with the scales of the verniers, and a journal-pin to secure the arc to the rule-bar.

8. The combination, substantially as described, of the parallel-ruler, one of the bars of which is provided with a circular opening and with verniers at a distance from said opening, a cam-disk journaled in said bar, a flanged sleeve carrying a spring-pressed arm, the outer end of which is held in contact with the cam-disk, a scaled arc provided centrally with a sleeve fitting within the first-named sleeve, a cone-headed screw, and a thumb-nut.

9. The combination, substantially as described, of one of the bars of a parallel-ruler, a scaled arc pivoted centrally thereto, and the verniers secured to the bar, one, L, upon a post capable of being rotated and the other upon a post arranged to be adjusted longitudinally of the bar, the vernier proper being connected to this last-named post by a transverse pivot.

10. The combination, with one of the rule-bars of a parallel-ruler, of a scaled arc pivoted centrally thereto, a parallel straight-edge rule projecting radially from the center of said arc, and a spring secured transversely of said rule near its outer end and carrying needle-points or markers, substantially as described.

11. The combination, substantially as described, of the parallel-ruler, the scaled arc pivoted centrally to one of the bars thereof, the straight-edge rule projecting radially from the center of the arc, a needle-guide secured to said straight-edge near its end, the exteriorly-threaded needles, the spring forked at its ends, and the needle-adjusters threaded to fit the needles and having a groove to receive the forked end of the spring.

In testimony whereof I affix my signature in presence of two witnesses.

HARRY S. GAY.

Witnesses:
C. J. PRICE,
SAML. COX.